United States Patent Office 3,035,369
Patented May 22, 1962

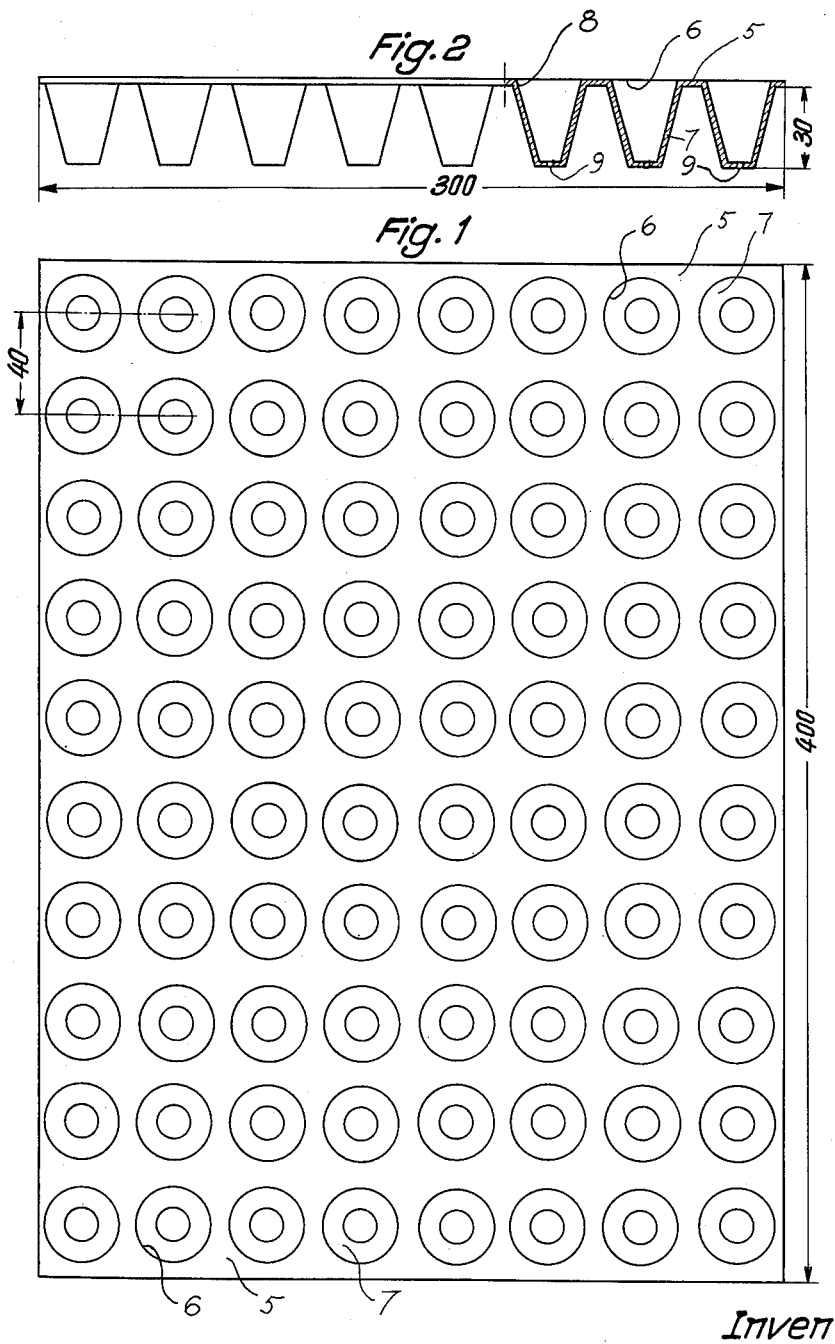

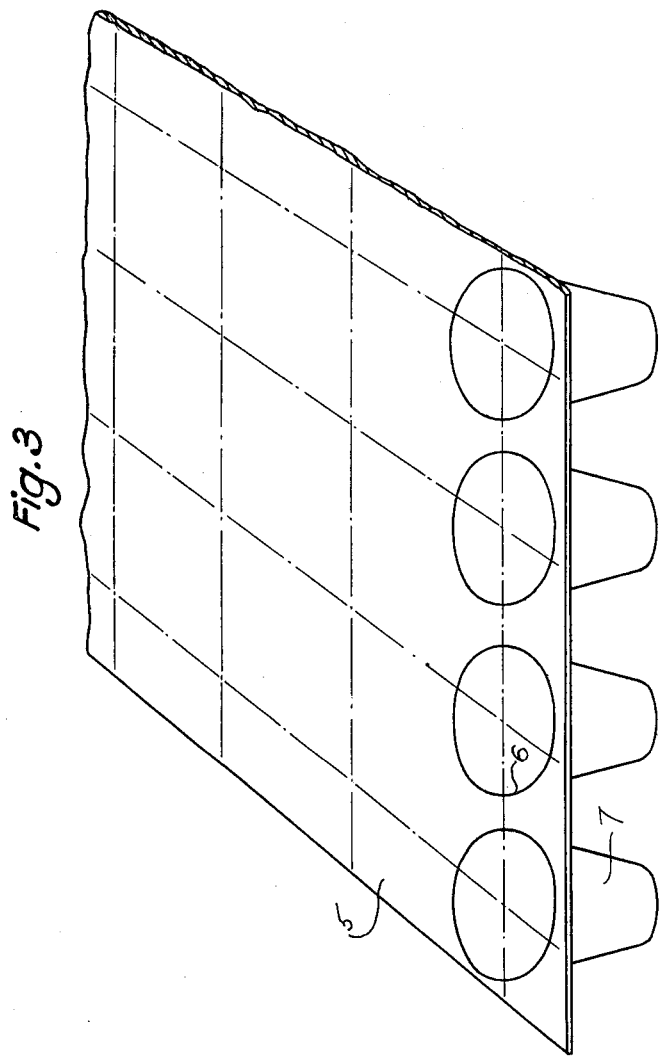

3,035,369
ASSEMBLY OF PLANT CONTAINERS
Hermann Helfert, Neumuhlerstr. 155,
Duisburg-Meiderich, Germany
Filed Sept. 29, 1958, Ser. No. 763,934
2 Claims. (Cl. 47—34)

This invention relates to devices employed in aid of the raising of plants. More particularly, the invention relates to containers in which plants can be raised.

Heretofore, plants have commonly been raised by growing a plurality of plants in a single bed, or by growing individual plants in individual containers. The growing of a plurality of plants in a single bed has some advantages, but has the disadvantage that damage is likely to be inflicted upon the plant when it is removed for transporting. The use of individual containers insures that damage will not be done to the plant root balls, but on the other hand, is inconvenient.

Another manner for raising plants is to employ a peat bed having a plurality of holes therein, the holes being filled with earth, and the plants being grown in the earth. This manner of raising plants has the disadvantage that the roots grow into the peat bed so that when a plant is withdrawn from the bed, some damage to the roots occurs.

Containers used in raising plants are commonly either a container which decomposes in the ground or a container formed of fire clay. The containers which decompose in the ground have the disadvantage that a container is required for each plant, and the container cannot be reused. The fired clay containers have the disadvantage that they are not convenient to handle and frequently damage to the plant root balls, when the plant is removed from the container, results.

The principal object of the present invention is to provide means for containing plants which are convenient to handle, economical, and of a nature such that damage is not done to the plant roots, when plants are removed from the containers.

In accordance with the invention, the apparatus for the raising of plants consists of a thin plate with recesses of substantially truncated conical shape distributed uniformly and closely adjacent to each other thereon, the depth of these recesses being of the same order of magnitude as the top diameter. The recesses therefore can have approximately the shape and size of ordinary flower pots. The entire apparatus preferably consists of a piece of a smooth material, for instance, plastic, and preferably consists of a material which is impervious to water.

Embodiments of the invention are shown in the drawing.

FIG. 1 is a top view of an apparatus in accordance with the invention; and

FIG. 2 shows the same apparatus in side view, partially in section; and FIG. 3 is a perspective view of same.

The invention provides an assembly of plant containers which can be formed by a plate having a plurality of openings therein, and a plurality of bottomed containers having open tops. A container is positioned in each opening with its upper periphery secured to the periphery of its opening. In a preferred embodiment, the plate and containers are formed of a material which is impervious to water. In another preferred embodiment, the inside surface of the containers is made smooth so that damage to plant roots upon removal of plants is unlikely. If desired, each container can be provided with a small opening in the bottom which will be suitable to permit drainage.

An assembly according to the invention is suitable as a permanent container for plants. When employed in this manner, the assembly can be arranged so that the plate is at grade level and the containers are embedded in the ground. Desirably, the pltae is impervious except for the openings for the containers. Such construction will preclude the growing of weeds intermediate the plants.

The apparatus shown in the drawing consists of a plate of a thickness of 1–3 mm. of a smooth plastic of a size of 300 x 400 mm. which has a total of 80 recesses of truncated conical shape, the upper diameter of which is 30 mm. and the depth about 35 mm.

The assembly is formed by a plate 5 having a plurality of openings 6. A bottomed container 7 having an open top 8 is disposed in each opening with its upper periphery secured to the periphery of its opening. If desired, each container can be provided with a hole in the bottom thereof.

The filling of these recesses is very simple; the seeding or planting can be effected by machine in view of the precisely predetermined position of the recesses. The plants which have been raised can easily be removed from the recesses since the root ball does not adhere to the smooth wall of the recess; accordingly, not only is the work of removal accelerated and the breaking of flower pots, which was previously so frequent, avoided, but an undamaged ball of earth is also assured. Furthermore, the transportation of the plants either from one place to another place in the garden or to the place of sale is greatly facilitated. The horizontal parts of the plate located between depressions prevent weeds growing between depressions, which is a great nuisance in connection with the previously customary use of flower pots inserted one alongside each other in a covered bed. The apparatus can be used as frequently as desired without changing. It is considerably lighter, less fragile and easier to clean than clay pots.

When the device is made of material which is impervious to water, for instance plastic or metal, there is less evaporation so that less watering is needed. When the depressions at the lower end are provided with holes, the lower ends of the depressions of the device can be placed or suspended in a nutrient solution so that the earthless growing of cuttings which was previously a difficult problem is solved. In this way, there can also, in a simple and economical manner, be effected the raising of slips or cuttings with pot balls in propagation sieve beds, with underground irrigation.

When the plates are made of suitable material, they can be cut in such a manner that individual plants can be sold with the pot formed by the recess.

The size of the devices and the number and size of their recesses can differ considerably from the example shown in FIGS. 1 and 2; in principle, all sizes of recesses entering into consideration for the raising of plants can be used.

What is claimed is:

1. A device for growing plants comprising a thin plate constructed of a water-impervious plastic material having a smooth surface and defining a plurality of depressions of truncated conical shape closely distributed over its surface, the axes of said depressions being parallel to each other and extending normal to the plane of said plate, each of said depressions being dimensioned to receive the root ball of a small plant and having a depth of substantially the same order of magnitude as the top diameter and being positioned from the next adjacent depression at a distance substantiaily smaller than said top diameter.

2. Device according to claim 1 in which the bottom of each of said depressions has defined therethrough an opening of relatively small size as compared to the size of said bottom.

References Cited in the file of this patent

UNITED STATES PATENTS

| | | |
|---|---|---|
| 905,238 | Schaffer | Dec. 1, 1908 |
| 1,904,072 | Nelson | Apr. 18, 1933 |
| 1,989,403 | Dauernheim | Jan. 29, 1935 |
| 2,302,045 | Neumann | Nov. 17, 1942 |
| 2,455,295 | Cox | Nov. 30, 1948 |
| 2,640,623 | Ryder | June 2, 1953 |
| 2,720,725 | Peerless | Oct. 18, 1955 |

FOREIGN PATENTS

| | | |
|---|---|---|
| 323,924 | Germany | Aug. 13, 1920 |